SCR BLOCKING PULSE GATE AMPLIFIER
Filed April 17, 1967
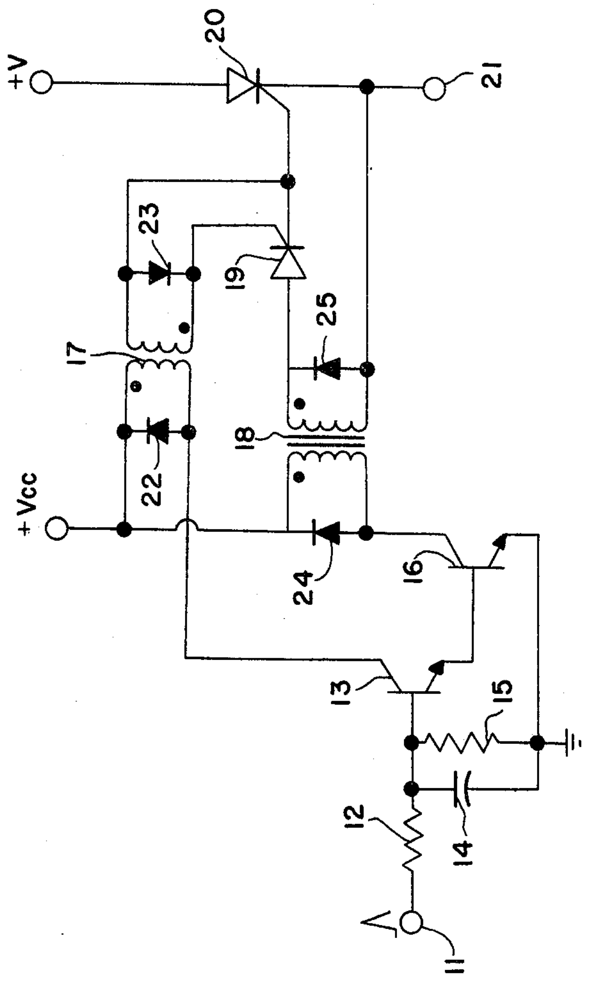
INVENTORS
EUGENE L. KELSEY
HUGH M. HOLT
BY [signatures]
ATTORNEYS 3,491,255

SCR BLOCKING PULSE GATE AMPLIFIER

Eugene L. Kelsey, Newport News, and Hugh M. Holt, Williamsburg, Va., assignors to the United States of America as represented by the Administrator of the National Aeronautics and Space Administration Filed Apr. 17, 1967, Ser. No. 631,848
Int. Cl. H03k *17/02*
U.S. Cl. 307—252 5 Claims

ABSTRACT OF THE DISCLOSURE

A circuit for gating a first silicon-controlled rectifier (SCR) which decreases the likelihood that a negative transient voltage on the cathode of the SCR will cause an unwanted gating of the SCR. When an input gating pulse is applied to the circuit, two simultaneous pulses are produced across the secondaries of two transformers. One of the two pulses is applied to a second SCR to gate it and the other pulse is applied through the gated second SCR to the first SCR to gate it. Hence, any negative voltage on the cathode of the first SCR will not gate the first SCR until after the second SCR has been gated.

The invention described herein was made by employees of the United States Government and may be manufactured and used by or for the Government for governmental purposes without the payment of any royalties thereon or therefor.

The invention relates generally to a silicon-controlled rectifier (SCR) pulse gate amplifier and more specifically concerns a gating circuit that will transfer a pulse of energy of predetermined width to the gate of an SCR and that will block all other changes of potential and/or transients at the SCR cathode that could cause false gating.

When an SCR is used as a switching device, it is sometimes subject to false gating. If a simple pulse transformer is used to couple the gating pulse to the SCR, the secondary of that transformer must be connected between the gate and cathode leads. This makes the SCR sensitive to the transients and voltage changes which might occur at the cathode. Negative gating can occur if these voltage changes are of sufficient amplitude and rise time, and an unwanted turn-on of the SCR device results.

It is an object of this invention to transfer gating pulses to an SCR in such a manner as to block all changes of potential at the cathode of the SCR that could cause false gating.

Other objects and advantages of this invention will further become apparent hereinafter and in the drawing, in which the sole figure is an electrical schematic of an embodiment of the invention.

In describing the embodiment of the invention illustrated in the drawing, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawing, the number 11 designates the input terminal. Input terminal 11 is connected through a base current limiting resistor 12 to the base of an NPN transistor 13. A capacitor 14 and a resistor 15 are connected in parallel between the base of transistor 13 and ground. Capacitor 14 provides a low impedance to ground for noise or high frequency transients and resistor 15 provides a simple clamp to ground for the base of transistor 13. The emitter of transistor 13 is connected to the base of an NPN transistor 16, and the emitter of transistor 16 is connected to ground. The collector of transistor 13 is connected through the primary of a transformer 17 to a +V*cc* voltage supply, and the collector of transistor 16 is connected through the primary of a transformer 18 to the +V*cc* voltage supply. The circuitry including transistors 13 and 16 is a simple amplifier. The secondary of transformer 17 is connected between the gate and cathode of an SCR 19. One terminal of the secondary of transformer 18 is connected to the cathode of an SCR 20, the other terminal of the secondary of transformer 18 is connected to the anode of SCR 19, and the cathode of SCR 19 is connected to the gate of SCR 20. The anode of SCR 20 is connected to a plus D.C. power supply +V, and the cathode of SCR 20 is connected to an output terminal 21. A diode 22 is connected across the primary of transformer 17, a diode 23 is connected across the secondary of transformer 17, a diode 24 is connected across the primary of transformer 18, and a diode 25 is connected across the secondary of transformer 18. The purpose of diodes 22–25 is to eliminate negative voltage spikes on the secondaries of transformers 17 and 18.

In the operation of the disclosed embodiment of this invention, a rectangular gating pulse is applied to input terminal 11. This input pulse is applied to the base of transistor 13 through the voltage divider network consisting of resistors 12 and 15. Capacitor 14 provides a low impedance to ground for noise or high frequency transients. When the input pulse is applied to the base of transistor 13, transistors 13 and 16 begin to conduct causing current to flow through the primaries of transformers 17 and 18. The flow of current through the primaries of transformers 17 and 18 induces voltages across the secondaries of these transformers. The induced voltage across the secondary of transformer 17 is applied between the gate and cathode of SCR 19 causing it to conduct. The induced voltage across the secondary of transformer 18 is applied through SCR 19 to the gate and cathode of SCR 20 causing SCR 20 to conduct. Hence, the D.C. power supply +V is applied to output terminal 21 and will be applied until the D.C. power supply is removed.

The primary advantage of this invention is that SCR 20 is not subject to negative gating. That is, if a sharp negative voltage appears at the cathode of SCR 20, the SCR will not conduct. If the secondary of transformer 18 was connected directly between the gate and the cathode of SCR 20, then a large, rapid negative voltage transition appearing at the cathode of SCR 20 would make it conduct. However, with the use of SCR 19 and its associated control circuitry, SCR 20 is not subject to negative gating. That is, if a large rapid negative voltage transition appears on the cathode of SCR 20, it will not conduct. This transient negative voltage will be blocked by SCR 19 and therefore will have no effect on the conduction of SCR 20. In other words, due to the blocking characteristic of SCR 19, the gate to cathode of SCR 20 remains nearly open-circuited until transformers 17 and 18 are excited simultaneously. Thus, rapid voltage changes at the cathode of SCR 20 cannot be interpreted by SCR 20 as gating signals.

It is to be understood that the form of the invention herewith shown and described is to be taken as a preferred embodiment. Various changes may be made in the shape, size and arrangements of parts. For example, equivalent elements may be substituted for those illustrated and described herein, parts may be reversed, and certain features of the invention may be utilized independently of the use of other features, all without departing from the spirit or scope of the invention as defined in the following claims.

What is claimed is:

1. A circuit for gating a first SCR upon the receipt of an input gating pulse comprising:
 means responsive to said input pulse for producing two simultaneous pulses, wherein said means includes two transformers with the pulses being produced across the secondaries of the two transformers;
 a second SCR;
 means for applying one of said two simultaneous pulses to said second SCR to gate it; and
 means including said second SCR for applying the other of said two simultaneous pulses to said first SCR to gate it after said second SCR has been gated whereby said first SCR is not subject to false gating.

2. A gating circuit according to claim 1 wherein said means for producing two simultaneous pulses includes amplifying means.

3. A circuit for gating a first SCR when an input gating pulse is received comprising:
 a power supply connected to the anode of said first SCR and an output terminal connected to the cathode of said first SCR;
 means responsive to said input gating pulse for producing two simultaneous pulses said means includes two transformers with the pulses being produced across the secondaries of the two transformers; includes two transformers with the pulses being produced across the secondaries of the two transformers;
 a second SCR with its cathode connected to the gate of said first SCR;
 means for applying one of said two simultaneous pulses between the cathode and gate of said second SCR to make it conductive; and
 means for applying the other of said two simultaneous pulses between the cathode of said first SCR and the anode of said second SCR to make said first conductive after said second SCR is made conductive whereby said first SCR is not subject to false gating by voltage changes at its cathode.

4. An SCR blocking pulse amplifier comprising:
 a first transformer;
 a second transformer;
 a two-stage amplifier with the primary of said first transformer connected in the first stage of the amplifier and the primary of said second transformer connected in the second stage of the amplifier such that when a gating pulse is applied to said amplifier a first pulse is produced across the secondary of said first transformer and a second pulse is produced across the secondary of said second transformer;
 a first SCR;
 means for connecting the secondary of said first transformer to said first SCR to gate it when said first pulse is produced;
 a second SCR; and
 means including said first SCR for connecting the secondary of said second transformer to said second SCR to gate it when said second pulse is produced and after said first SCR has been gated whereby said second SCR is not subject to false gating.

5. An SCR blocking pulse amplifier according to claim 4 wherein said means for connecting the secondary of said second transformer to said second SCR to gate it consists of said first SCR connected in series with the secondary of said second transformer between the gate and cathode of said second SCR.

References Cited

UNITED STATES PATENTS

| | | | |
|---|---|---|---|
| 3,070,739 | 12/1962 | Hansen et al. | 307—252 XR |
| 3,267,337 | 8/1966 | Doyle et al. | 307—252 XR |
| 3,348,063 | 10/1967 | Bray | 307—252 |
| 3,381,212 | 4/1968 | Peltola et al. | 307—252 XR |
| 3,421,023 | 1/1969 | Fry | 307—252 |

JOHN S. HEYMAN, Primary Examiner

J. ZAZWORSKY, Assistant Examiner

U.S. Cl. X.R.

307—237, 305